(12) United States Patent
Goyal et al.

(10) Patent No.: US 12,033,348 B1
(45) Date of Patent: Jul. 9, 2024

(54) METHODS AND APPARATUS FOR GENERATING IMAGES OF OBJECTS DETECTED IN VIDEO CAMERA DATA

(71) Applicant: Verkada Inc., San Mateo, CA (US)

(72) Inventors: Rishabh Goyal, San Mateo, CA (US); Song Cao, Foster City, CA (US); Yi Xu, Burlingame, CA (US); Bhavna Sud, Palo Alto, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 18/450,085

(22) Filed: Aug. 15, 2023

(51) Int. Cl.
G06T 7/70 (2017.01)
G06T 7/00 (2017.01)
G06T 7/12 (2017.01)
G06T 7/20 (2017.01)
G06T 11/00 (2006.01)
G06V 10/764 (2022.01)

(52) U.S. Cl.
CPC ............ *G06T 7/70* (2017.01); *G06T 7/0002* (2013.01); *G06T 7/12* (2017.01); *G06T 7/20* (2013.01); *G06T 11/00* (2013.01); *G06V 10/764* (2022.01); *G06T 2207/20132* (2013.01); *G06T 2207/30201* (2013.01); *G06V 2201/07* (2022.01)

(58) Field of Classification Search
CPC .......... G06T 7/70; G06T 7/12; G06T 7/0002; G06T 7/20; G06T 11/00; G06T 2207/20132; G06T 2207/30201; G06V 10/764; G06V 2201/07
See application file for complete search history.

(56) References Cited

U.S. PATENT DOCUMENTS

| | | | |
|---|---|---|---|
| 8,688,675 | B2 | 4/2014 | Albers et al. |
| 9,361,521 | B1 | 6/2016 | McLean et al. |
| 11,429,664 | B1 | 8/2022 | Xu et al. |
| 2006/0256210 | A1 | 11/2006 | Ryall et al. |
| 2007/0257986 | A1 | 11/2007 | Ivanov et al. |
| 2007/0291118 | A1 | 12/2007 | Shu et al. |

(Continued)

OTHER PUBLICATIONS

Gaikwad B, Karmakar A. End-to-end person re-identification: Real-time video surveillance over edge-cloud environment. Computers and Electrical Engineering. Apr. 1, 2022;99:107824. (Year: 2022).*

(Continued)

*Primary Examiner* — Vu Le
*Assistant Examiner* — Tracy Mangialaschi
(74) *Attorney, Agent, or Firm* — COOLEY LLP

(57) ABSTRACT

A method for generating cropped images depicting objects captured in video data includes receiving, at a processor of a video camera system, a video stream including a series of video frames depicting an object. A classification for the object is generated, and an occurrence of the object being detected is identified in an additional video frame(s) from the series of video frames. A motion associated with the object is calculated based on the classification and the additional video frame(s). At least one image that depicts the object and includes a cropped portion of a video frame from the series of video frames is generated, along with an associated set of at least one quality score, in response to calculating the motion. The method also includes causing transmission of the at least one image to at least one remote compute device based on the set of at least one quality score.

30 Claims, 9 Drawing Sheets

(56) References Cited

U.S. PATENT DOCUMENTS

| | | |
|---|---|---|
| 2008/0091526 A1 | 4/2008 | Shoemaker |
| 2009/0238411 A1 | 9/2009 | Adiletta et al. |
| 2010/0238285 A1 | 9/2010 | DeSimone et al. |
| 2012/0062732 A1 | 3/2012 | Marman et al. |
| 2013/0091470 A1 | 4/2013 | Sciammarella et al. |
| 2013/0124998 A1 | 5/2013 | Pendergast et al. |
| 2014/0369596 A1 | 12/2014 | Siskind et al. |
| 2015/0248429 A1 | 9/2015 | Pregueiro et al. |
| 2016/0171852 A1 | 6/2016 | Lin et al. |
| 2016/0232234 A1 | 8/2016 | Baek et al. |
| 2017/0024986 A1 | 1/2017 | Austin |
| 2017/0078767 A1 | 3/2017 | Borel et al. |
| 2018/0113577 A1 | 4/2018 | Burns et al. |
| 2018/0115788 A1 | 4/2018 | Burns et al. |
| 2019/0034734 A1* | 1/2019 | Yen .................... G06F 18/2413 |
| 2019/0043201 A1 | 2/2019 | Strong et al. |
| 2019/0244366 A1 | 8/2019 | Yu et al. |
| 2019/0377957 A1 | 12/2019 | Johnston et al. |
| 2021/0027068 A1 | 1/2021 | Gayatri et al. |
| 2021/0233255 A1 | 7/2021 | Celestini |
| 2022/0254162 A1 | 8/2022 | Felemban et al. |

OTHER PUBLICATIONS

Lu J, Zou B, Cheng Z, Pu S, Zhou S, Niu Y, Wu F. Object-qa: Towards high reliable object quality assessment. arXiv preprint arXiv: 2005.13116. May 27, 2020. (Year: 2020).*

Hata, Toshihiko, et al. "Surveillance system with mega-pixel scalable transcoder." Visual Communications and Image Processing 2007. vol. 6508. SPIE, 2007. (Year: 2007).*

Chen, Long, et al. "Real-time multiple people tracking with deeply learned candidate selection and person re-identification." 2018 IEEE international conference on multimedia and expo (ICME). IEEE, 2018. (Year: 2018).*

Tissainayagam, Prithiraj, and David Suter. "Visual tracking with automatic motion model switching." Pattern Recognition 34.3 (2001) : 641-660. (Year: 2001).*

Albers, et al., "Smart Search & Retrieval on Video Databases," IEEE, 2006, pp. 475-476.

Carta et al. "Efficient Thumbnail Identification through Object Recognition," WEBIST 2020—16th International Conference on Web Information Systems and Technologies, 2020, 209-216.

Non-Final Office Action for U.S. Appl. No. 18/320,467 dated Jul. 27, 2023, 30 pages.

Non-Final Office Action for U.S. Appl. No. 18/320,617 dated Aug. 14, 2023, 25 pages.

Yuan, et al. "Sentence Specified Dynamic Video Thumbnail Generation," arXiv:1908.04052v2 [cs.CV], Oct. 16, 2019, 14 pages.

Co-pending U.S. Appl. No. 18/320,467, inventors Mwaura; David et al., filed May 19, 2023.

Co-pending U.S. Appl. No. 18/320,617, inventors Nan; Hao et al., filed May 19, 2023.

Final Office Action for U.S. Appl. No. 18/320,467 dated Dec. 20, 2023, 35 pages.

Notice of Allowance for U.S. Appl. No. 18/320,617 dated Apr. 2, 2024, 8 pages.

* cited by examiner

METHODS AND APPARATUS FOR GENERATING IMAGES OF OBJECTS DETECTED IN VIDEO CAMERA DATA

FIELD

The present disclosure generally relates to video surveillance, and more specifically, to systems and methods for generating cropped images based on video data.

BACKGROUND

Image processing techniques exist for performing object detection. Object detection can include the detection of depicted objects such as people and license plates. Applications of object detection include, for example, video surveillance and facial recognition.

SUMMARY

In some embodiments, an apparatus includes a processor and a memory operably coupled to the processor. The memory stores instructions to cause the processor to receive a video stream including a series of video frames and to generate a classification for an object depicted in a first video frame from the series of video frames. The memory also stores instructions to cause the processor to identify, in each of at least one additional video frame from the series of video frames, an occurrence of the object being detected in that at least one additional video frame. The memory also stores instructions to cause the processor to calculate a motion associated with the object based on the classification and the at least one additional video frame. The memory also stores instructions to cause the processor to generate at least one image that depicts the object and that includes a cropped portion of a video frame from the series of video frames. The memory also stores instructions to cause the processor to generate a quality score for each image from the at least one image that depicts the object, to define a set of quality scores. The memory also stores instructions to cause the processor to cause transmission of the at least one image to at least one remote compute device based on the set of quality scores.

In some embodiments, a non-transitory, processor-readable medium stores instructions that, when executed by a processor, cause the processor to receive a plurality of temporally arranged images, each image from the plurality of temporally arranged images including a depiction of an object. The non-transitory, processor-readable medium also stores instructions to generate a plurality of temporally arranged compressed images based on the plurality of temporally arranged images. The non-transitory, processor-readable medium also stores instructions to perform an identification of the object based on at least one compressed image from the plurality of temporally arranged compressed images. The non-transitory, processor-readable medium also stores instructions to determine an object trajectory associated with the object based on the identification and the plurality of temporally arranged compressed images. The non-transitory, processor-readable medium also stores instructions to generate a set of cropped images based on the object trajectory, each cropped image from the set of cropped images including a region of an image from the plurality of temporally arranged images, the image being different from each remaining image from the plurality of temporally arranged images, the region being smaller than an entirety of the image and depicting the object. For each cropped image from the set of cropped images, an image quality score is based on the associated region depicting the object, and that cropped image is included in at least one of a first cropped image subset or a second cropped image subset based on the image quality score and the identification. Additionally, for each cropped image from the set of cropped images, the first cropped image subset is transmitted to a first remote compute device for display, and the second cropped image subset is transmitted to a second remote compute device different from the first remote compute device, for postprocessing.

In some embodiments, a non-transitory, processor-readable medium storing instructions that, when executed by a processor, cause the processor to receive video-derived detection data associated with an object and assign the video-derived detection data to one of: (1) a new motion track, or (2) an existing motion track associated with historical video-derived detection data associated with the object. The processor-readable medium also stores instructions to cause the processor to generate a confirmed motion track based on at least one of: (1) a confidence score associated with at least one of the video-derived detection data or the historical video-derived detection data, or (2) a count associated with the video-derived detection data and the historical video-derived detection data. The processor-readable medium also stores instructions to cause the processor to generate a plurality of closeup images, each closeup image from the plurality of closeup images depicting an enlarged view of the object based on the confirmed motion track and at least one of the video-derived detection data or the historical video-derived detection data. The processor-readable medium also stores instructions to cause the processor to generate a quality score for each closeup image from the plurality of closeup images, to produce a plurality of quality scores. The processor-readable medium also stores instructions to cause the processor to select at least one closeup image from the plurality of closeup images based on the plurality of quality scores, and transmit at least one signal to cause display of the at least one closeup image via a user interface of a remote compute device.

DETAILED DESCRIPTION

Figure 1:
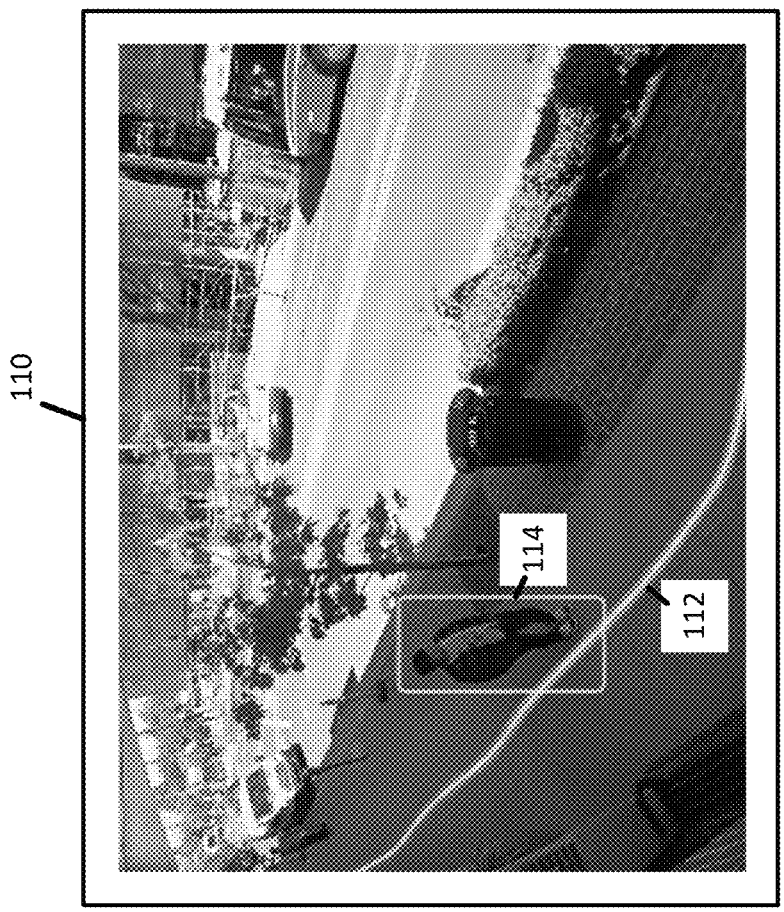
FIG. 1 includes an annotated image showing an identified object from a video stream, a motion track generated for the object, and a cropped image generated based on the motion track, according to some embodiments.
Figure 1:
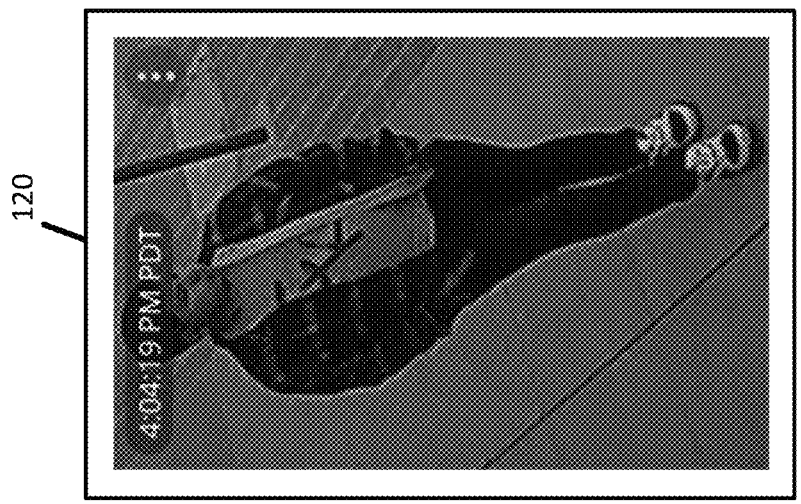

Video systems exist that are capable of performing object detection, for example in applications such as facial recognition and license plate recognition. Such video systems, however, are not typically interactive (e.g., they do not typically take into account user inputs), and/or do not produce alerts or alarms in response to a particular object being detected. Additionally, many object detection processes are not computationally influenced by a motion or transitory nature of the object being detected. Moreover, such processes do not typically generate cropped images of an object based on a classification of the object, motion of the object, and/or visibility of the object. Systems, methods, and apparatuses described herein, in contrast, generate cropped images (also referred to herein as "hyperzoom images" or "closeup images") and/or alerts based on object detection data, object motion data, quality scores, and/or user inputs (also referred to herein as "user settings").

For example, in some embodiments, a compute device can be configured to receive a video stream from a video camera system, the video stream including a series of temporally arranged video frames. The compute device can be configured to detect (e.g., via a processor) an object that is depicted in the video stream. Detecting an object can include, for example, generating an identification for the object, generating a bounding box for the object, generating a classification for the object, classifying features of the object, segmenting a pixel(s) that depicts the object, and/or the like. The compute device can be further configured to calculate a motion associated with the object and characterize said motion (e.g., by associating said motion with a confirmed motion track, as described herein). Based on the confirmed motion track and the generated object identification/classification, the compute device can be configured to generate a cropped image(s) of the object. The cropped image(s) can be generated from a cropped region(s) of the video frame(s) that depict the object. The compute device can be further configured to generate a quality score(s) for the cropped image(s) based on image resolution, lighting conditions, object orientation, depicted object position within the respective video frame from which the cropped image is generated, object depiction size, and/or the like, as described herein.

The compute device can be configured to transmit the cropped image(s) to (1) a remote mobile compute device based on user settings defined by a user of that remote mobile compute device, and/or (2) a remote compute device configured to perform additional image processing (e.g., post-processing), as described herein. In some implementations, the compute device can be further configured to send the cropped image(s) based on the respective image quality score, as described herein.

The compute device, as part of the video camera system, can be local to a video camera or remote from a video camera. User inputs made via the compute device can be communicated to the video camera system and/or used by the video camera system during its operations, e.g., in the context of one or more video monitoring operations. Based on the cropped image(s), an alert or alarm may be generated (optionally as part of the video monitoring operations) by the video camera system, the remote compute device, and/or the remote mobile compute device, and can be communicated to the user and/or to one or more other compute devices. The alert or alarm can be communicated, for example, via a software "dashboard" displayed via a GUI of one or more compute devices operably coupled to or part of the video camera system. The alert or alarm functionality can be referred to as, or as being part of, an "alarm system."

As used herein, "object motion" can have an associated sensitivity, which may be user-defined/adjusted and/or automatically defined. A deviation of one or more parameters within or beyond the associated sensitivity may register as object motion. The one or more parameters can include, by way of non-limiting example, and with respect to a pixel(s) associated with the object, one or more of: a difference in a pixel appearance, a percentage change in light intensity for a region or pixel(s), an amount of change in light intensity for a region or pixel(s), an amount of change in a direction of light for a region or pixel(s), etc.

In some embodiments, the detection of object motion can be based on semantic data. Stated another way, the object motion may be tracked based on the type of object that is changing within the field of view of the video camera. In some implementations, a different motion model and/or a uniquely parameterized and/or modified motion model can be used to detect the object motion based on semantic data, as described herein.

In some embodiments, the processing involved as part of cropped image generation occurs at/on a video camera (also referred to herein as an "edge device") itself, such as a security camera/surveillance camera. For example, one or more methods described herein can be implemented in code that is onboard the video camera. The code can include instructions to automatically classify at least one object that is depicted in a series of video frames (e.g., a video clip). In some implementations, the series of video frames may include a series of temporally arranged compressed images (e.g., down sampled images and/or images that are reduced in size and/or pixel resolution). For example, the video camera may capture video data (e.g., a series of uncompressed and/or high-resolution video frames) and the compute device can compress the video data to generate the series of temporally arranged compressed images. The compute device can be configured to identify an occurrence of an object that is depicted within a compressed image from the series of temporally arranged compressed images. The occurrence can be included in, for example, video-derived detection data. In some implementations, the compute device can include a processor that is configured to use a neural network (e.g., a convolutional neural network (CNN) adapted for image recognition) to identify the occurrence of the object (i.e., to generate the classification for the object).

As a result of identifying the occurrence of an object, the compute device can be configured to calculate motion associated with the object occurrence. For example, the compute device can be configured to calculate the motion based on whether the identified/classified object is an object of interest (e.g., a human, a vehicle, a dog, etc.) or is not an object of interest (e.g., a bird, an insect, a wind-blown tree, etc.). The compute device can be further configured to select a motion model from a plurality of motion models based on the object identification/classification, where the selected model is configured (e.g., parameterized) for the identified object type. Calculating motion can include assigning the object occurrence to a motion track (e.g., assigning an object detection to one track ID from a set of track IDs). For example, the object occurrence detected within a compressed image can be associated with an additional object occurrence(s) (i.e., an object occurrence(s) included in historical video-derived detection data) detected in previous compressed images from the series of temporally arranged compressed images. The compute device can determine that a current object occurrence is associated with a previous object occurrence(s) (e.g., the object being the same for all occurrences) based on a motion model that generates an expected motion for an object. This expected motion generated by the motion model can be compared to the objects actual location as inferred by the objects position within a later compressed image from the series of temporally arranged compressed images.

In some implementations, the motion model can include a Kalman filter and/or a suitable tracking filter (e.g., a linear Kalman filter, an extended Kalman filter, an unscented Kalman filter, a cubature Kalman filter, a particle filter, and/or the like). For example, a linear Kalman filter can be used when an object exhibits dynamic motion that can be described by a linear model and the detections (i.e., measurements) are associated with linear functions of a state vector. In some implementations, the compute device can select a Kalman filter from a plurality of Kalman filters based on the object identification, where each Kalman filter is parameterized based on the type of object (e.g., car, human, etc.) represented by the identification. Each type of object, for example, can be associated with a nominal motion that is described by the respective Kalman filter.

Based on expected motion generated by the motion model, the compute device can be configured to automatically generate and/or automatically update a motion track that is associated with the object. A motion track can include, for example, a set of object detection(s) and the time(s) and/or video frame(s) at which the detection(s) was recorded. For example, a plurality of objects can be depicted in video data, and each object from the plurality of objects can have an associated motion. In some instances, at least two of these objects can be associated with the same identification (e.g., the objects can include two different humans in close proximity to one another). To determine whether object detections in two or more compressed images from the series of temporally arranged compressed images are associated with an object in motion or two different objects, the motion model can determine a likelihood and/or feasibility that the depictions of the object are the result of motion of that object or are the result of the detections being associated with a plurality of objects. In some implementations, the two or more compressed images can each be associated with a time stamp. These time stamps can be used to determine whether an object of a specified type (as determined by the identification) could feasibly undergo motion within a time period defined by the time stamps to result in a change in location depicted between the two or more compressed images. For example, the motion model can be configured to differentiate between (1) two humans appearing in different locations within different frames and (2) a human in motion based, at least in part, on an average, probable, and/or possible human running speed.

An object detection can be added to an existing motion track if the motion model indicates that the object's displacement within a compressed image is possible and/or feasible based on a motion estimate generated by the motion model for an earlier object detection from a previous compressed image. If the object detection cannot be matched to an existing motion track, a new motion track can be generated for the object, and subsequent detections of the object in later compressed images can be added to that motion track based on the motion model.

A motion track can be confirmed based on the number of object detections that are added to that track (i.e., the length of the track) and/or based on a confidence of the detections that are added to the track (i.e., a likelihood that an object is of a type represented by the generated identification). For example, a motion track can remain unconfirmed until two or more object detections from two or more compressed images are added to the motion track. In some implementations, a motion track can remain unconfirmed until two or more object detections that each have a confidence above a threshold are added to the motion track. A motion track can be deleted based on a length of time and/or a number of successive compressed images does not include an object detection that is added to the motion track.

Motion tracking based on streamed video frames generated by the video camera can be performed continuously, iteratively, according to a predefined interval (e.g., regularly), and/or according to a predefined schedule.

At least one cropped image depicting the object can be generated based on the motion track being confirmed. The cropped image can include, for example, a closeup image of an object associated with a confirmed motion track. In some instances, generating cropped images only for confirmed motion tracks can prevent false alarms and/or unnecessary alerts for detections of stationary objects (e.g., parked cars) and/or objects undergoing transient and/or short-lived motion (e.g., a rustling tree). In some embodiments, at least one cropped image can be generated from the uncompressed video data (e.g., the temporally arranged uncompressed images), such that the at least one cropped image has a greater image resolution than the compressed image(s) used to generate the object identification and/or the motion track for the object. A cropped image can include a cropped region of an uncompressed image, where the cropped region includes a depiction of an object associated with a confirmed motion track. In some instances, if a plurality of objects is present within a video frame, and each object has an associated motion (i.e., a plurality of confirmed motion tracks are concurrently associated with a video frame), a plurality of cropped images can be generated from the video frame, such that each cropped image depicts a respective object from the plurality of remaining objects. In some implementations, a plurality of cropped images can be generated from a plurality of temporally arranged uncompressed images that are associated with a plurality of temporally arranged compressed images depicting the object undergoing motion. In some implementations, the number of cropped images that are generated for a confirmed motion track can be based on the object identification and/or a length of time that the object is depicted in the video data (e.g., the length of the motion track associated with the object). For example, a greater number of cropped images can be generated for an object identified as a human that is loitering within the camera field of view, and fewer cropped images can be generated for a car that temporarily drives through the field of view.

The compute device can be configured to generate a quality score(s) for each cropped image that is generated based on the confirmed object track. In some implementations, the quality score can be based on the object type as determined by the generated identification. For example, a quality score for a cropped image of an object identified as a human can be based on a criterion or criteria specific to objects identified as human. In some implementations, such criterion or criteria can include a presence, an orientation and/or a visibility of the face of the object identified as human. If the face is oriented away from the video camera (i.e., obscured from the video camera's field of view and/or not visible or partially visible in the cropped image), a penalty can be applied to the quality score, resulting in a lower quality score. If the face is oriented towards the video camera (i.e., unobstructed from the video camera's field of view and/or substantially visible in the cropped image), an increase can be applied to the quality score.

In some implementations, a quality score for a cropped image of an object identified as a vehicle can be based on a criterion or criteria specific to objects associated with a vehicle identification/classification. For example, such criterion or criteria can include an orientation and/or visibility of vehicle feature, such as a vehicle's license plate, model badge, and/or the like. A quality score for a cropped image of an object identified as a vehicle can be higher if, for example, the license plate and/or vehicle badge is visible and/or readable in the cropped image.

A quality score for a cropped image can also be based on a detected object's location (as depicted) in the image (e.g., the uncompressed video frame/image) from which the cropped image was generated. For example, if the depicted object appears towards the edge of the video frame (i.e., the cropped image is cropped from a region of the uncompressed video frame that is proximal to the edge of the uncompressed video frame), a penalty can be applied to that cropped image. Said differently, an uncompressed video frame and/or image can include a first pixel that is associated with the depicted object (e.g., a pixel is disposed substantially centrally in the depiction of the object) and second pixel that is disposed substantially centrally in the uncompressed video frame and/or image. The image quality score can be based on a distance between the first pixel and the second pixel. For example, the quality score can be penalized for a cropped image that has a larger distance between the first pixel and second pixel compared to a cropped image that has a smaller distance.

In some implementations, a quality score for a cropped image can be based on a size of the object depicted in the cropped image. For example, an object can be associated with a smaller number of pixels if the object is located further away from the video camera. The quality score can be based on a size and/or resolution metric (e.g., a metric based on a number of pixels associated with the object), where the quality score is penalized based on a size metric that indicates that the object is or was located distantly (e.g., at a distance exceeding a predefined threshold distance) from the video camera. In some implementations, the quality metric can be based on a clarity metric (e.g., a metric associated with a lighting condition, contrast, haze, and/or the like).

After a plurality of cropped images have been generated for an object that is associated with a confirmed motion track, the compute device can be configured to transmit at least one cropped image to a first remote compute device (e.g., a user-associated remote mobile compute device, such as a smartphone, tablet, wearable device, laptop, and/or the like) and/or a second remote compute device (e.g., a backend server, high performance computer, backend compute device, and/or the like). In some implementations, a greater number of cropped images from the plurality of cropped images can be sent to the second remote compute than the number of cropped images that are sent to the first remote compute device. For example, more cropped images can be sent to the second remote compute device for post-processing (as described herein), and fewer cropped images can be sent to the first remote compute device to alert a user. A user may not wish to receive a greater number of cropped images due to inconvenience, storage limitations, bandwidth limitations, etc. Therefore, in some instances, the compute device can be configured to send to the first remote compute device one cropped image or a selection of cropped images from the plurality of cropped images. This cropped image or the selection of cropped images can be selected from the plurality of cropped images based on the image quality score associated with the cropped image. For example, the cropped image with highest image quality score from the plurality of cropped images can be selected to be transmitted to the user associated remote compute device. In some instances, a user can control the number of cropped images associated with a motion track and/or a time period that are sent to that user (e.g., via a GUI that includes tunable user settings) from the compute device associated with the user.

In some instances, all cropped images or a selection of cropped images from the plurality of cropped images can be sent to the second remote compute device for post-processing. Post-processing can include, for example, facial recognition, feature segmentation, manual inspection, and/or the like. In some implementations, post-processing can include a confirmation of the classification and/or identification of an object depicted in the cropped object and/or an activity being performed by the object and depicted in a plurality of cropped images. The confirmation can be performed, for example, prior to generating an alert notification and/or an alarm at the first compute device to alert the user, such that false alarms that are transmitted to a user are prevented or reduced. In some instances, the confirmation can be performed based on a poor confidence associated with the object detection and/or identification and/or a poor image quality score associated with the cropped image of the object. If an object detection is associated with low confidence (e.g., via an assigned confidence value), supplemental information and/or data can be transmitted to the second remote compute device, such as larger files, high definition (HD) video data, high resolution image data, and/or the like. In some instances, the first compute device may not have sufficient resources (e.g., processing resources, memory resources, bandwidth, and/or the like) to perform the post-processing.

FIG. 1 includes annotated images showing examples of a motion track 112, an object identification 114, and a cropped image 120 of a human generated from video data, according to some embodiments. As shown in the left portion of FIG. 1, video data can include a video frame 110 that can depict, by way of example, a human within the field of view of a video camera that can generate the video data. The video frame 110 can further depict, by way of example, a parked car. An identification 114 can be generated for the human, and the identification 114 can be associated with a motion track 112 based on the identification, a motion model (e.g., a Kalman filter), and/or previous identifications from previous video frames from the video data. Although not shown in FIG. 1, an identification can also be generated for the parked vehicle and can be prevented from being assigned to a motion track based on this identification and a lack of motion associated with the parked car. As shown in the right portion of FIG. 1, a cropped image 120 can be generated based on the identification 114 and the motion track 112. In some implementations, the cropped image 120 can be generated from uncompressed video data that does not include the video frame 110 (which can be, for example, a compressed video frame).

Figure 2:
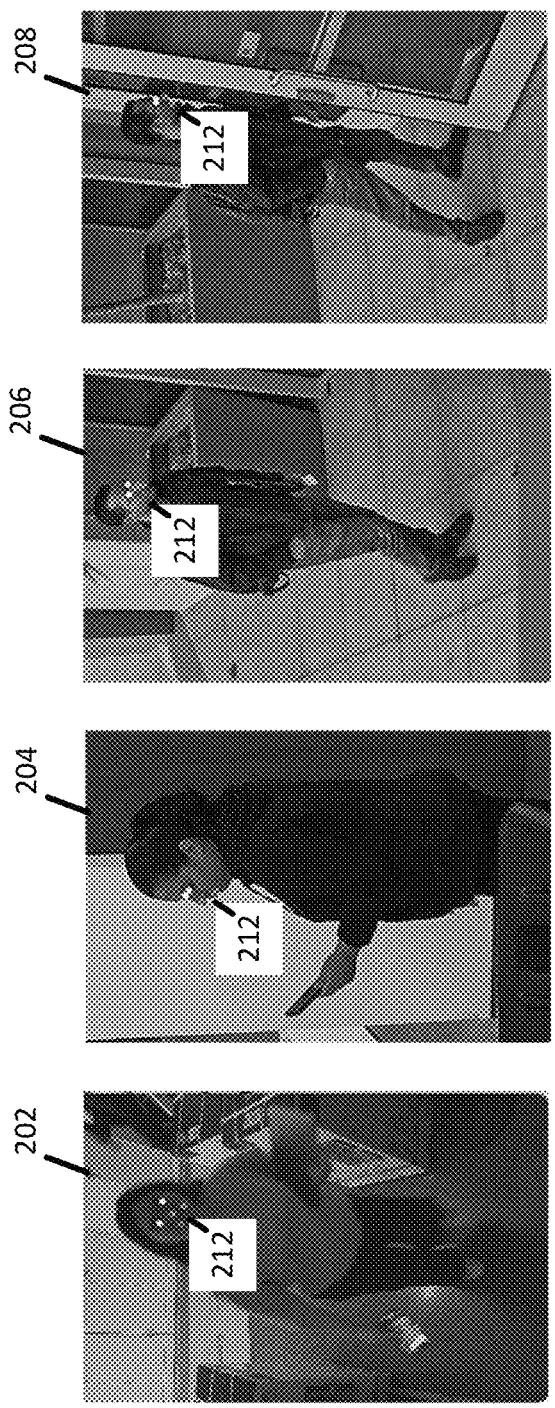
FIG. 2 shows cropped images used to generate quality scores, according to some embodiments.

FIG. 2 includes annotated images showing example cropped images 202-208, according to some embodiments. Each of the cropped images 202-208 can include at least one marker 212 that can be used to determine one or more image quality scores for the respective cropped images 202-208. For example, the at least one marker 212 can indicate and/or represent a feature (e.g., a face) of an object (e.g., a human) that is depicted in a cropped image. The at least one marker 212 can include, for example, five markers associated with facial features, such as a left eye, a right eye, a nose, a left mouth portion, and a right mouth portion, respectively. The positions of these markers within the cropped image and/or their positions relative to each other can be used to determine a visibility or occlusion of the face and/or the respective facial features.

Figure 3:
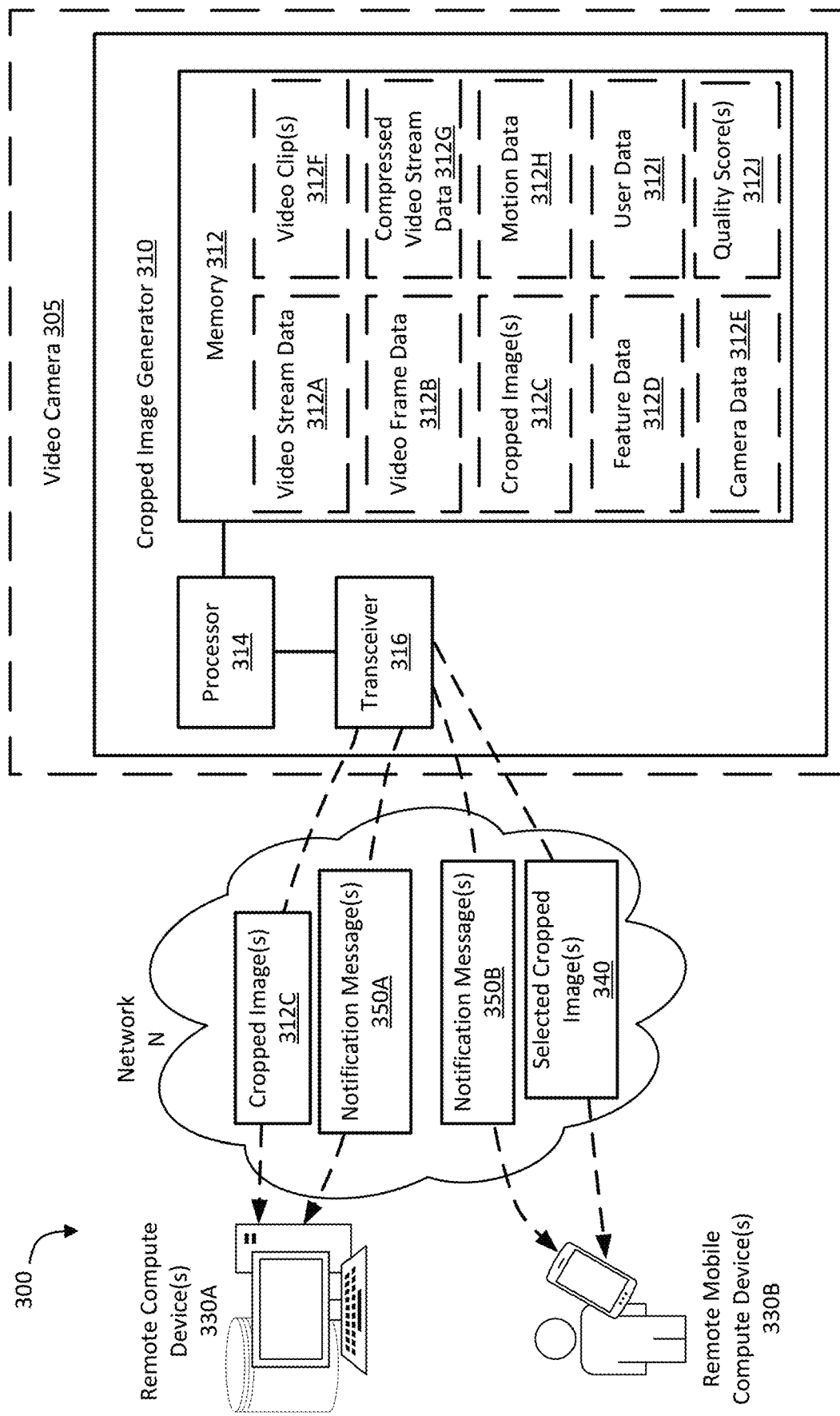
FIG. 3 is a system diagram showing a first example implementation of a system for generating and transmitting cropped images of objects based on video data, according to some embodiments.

FIG. 3 is a system diagram showing an example implementation of a cropped image generation system 300 for objects identified based on a video stream, according to some embodiments. As shown in FIG. 3, the cropped image generator 310 includes a processor 314 operably coupled to a memory 312 and a transceiver 316. The cropped image generator 310 is optionally located within, co-located with, located on, in communication with, or as part of a video camera 305. The memory 312 stores one or more of video stream data 312A, video frame data 312B, cropped image(s) 312C, feature data 312D, camera data 312E, video clip(s) 312F, compressed video stream data 312G, motion data 312H, user data 312I, or quality score(s) 312J.

The video stream data 312A can include, by way of example only, one or more of video imagery, date/time information, stream rate, originating internet protocol (IP) address, etc. The video frame data 312B can include, by way of example only, one or more of pixel count, object classification(s), video frame size data, etc. The cropped image(s) 312C can include, by way of example, imagery data depicting an object associated with an identification included in the video frame data 312B. The cropped image(s) 312C can include, for example, the cropped image 120 of FIG. 1 and/or the cropped images 202-208 of FIG. 2. The feature data 312D can include, by way of example, an identified feature(s) (e.g., a face and/or a facial feature, or a license plate) of the object depicted in a cropped image. The feature data 312D can be used to determine a quality score(s) (e.g., the quality score(s) 312J, as described herein).

The camera data 312E can include, by way of example only, one or more of camera model data, camera type, camera setting(s), camera age, and camera location(s). The video clip(s) 312F can include, by way of example, a series of temporally arranged images that can be used to track motion (e.g., by generating motion tracks) of an object depicted in those temporally arranged images. The compressed video stream data 312G can include, by way of example, lossy video data generated by a video codec (not shown). The compressed video stream data 312G can be generated from the video stream data 312A, the compressed video stream data 312G having a lesser bit rate than the video stream data 312A. The motion data 312H can include, by way of example, at least one of an unconfirmed motion track or a confirmed motion track. The motion data 312H can further include a time and/or a number of sequential video frames that an object has been depicted and/or detected in. The motion data 312H can further include a time and/or a number of video frames since an object detection (e.g., a time that indicates an absence of object detection).

The user data 312I can include, by way of example only, one or more of user identifier(s), user name(s), user location(s), and user credential(s). The user data 312I can also include, by way of example, cropped image transmission frequency, cropped image count per transmission and/or period of time, capture frequency, desired frame rate(s), sensitivity/sensitivities (e.g., associated with each from a plurality of parameters), notification frequency preferences, notification type preferences, camera setting preference(s), etc.

The quality score(s) 312J can include, by way of example only, a metric associated with the visibility of an object and/or a feature of the object. The notification message(s) 350A and/or 350B can include, by way of example only, one or more of an alert, semantic label(s) representing the type(s) of object(s) and/or motion detected, time stamps associated with the cropped image(s) 312C, quality score(s), etc.

The cropped image generator 310 and/or the video camera 305 is communicatively coupled, via the transceiver 316 and via a wired or wireless communications network "N," to one or more remote compute devices 330A (e.g., including a processor, memory, and transceiver) such as workstations, desktop computer(s), or servers, and/or to one or more remote mobile compute devices 330B (e.g., including a processor, memory, and transceiver) such as mobile devices (cell phone(s), smartphone(s), laptop computer(s), tablet(s), etc.). During operation of the cropped image generator 310, and in response to detecting an object and/or motion, and/or in response to generating a cropped image(s), notification message(s) 350A and 350B can be automatically generated and sent to one or both of, respectively, the remote compute device(s) 330A or the remote mobile compute device(s) 330B. The notification message(s) 350A and 350B can include, by way of example only, one or more of an alert, semantic label(s) representing the type(s) of object(s) and/or motion detected, time stamps associated with the cropped image(s) 312C, quality score(s), etc. Alternatively or in addition, cropped image(s) 312C can be automatically sent to the remote compute device(s) 330A in response to detecting an object and/or motion. In some instances, selected cropped image(s) 340 can be automatically selected from the cropped image(s) 312C and sent to the remote mobile compute device(s) 330B in response to detecting an object and/or motion.

Figure 4:
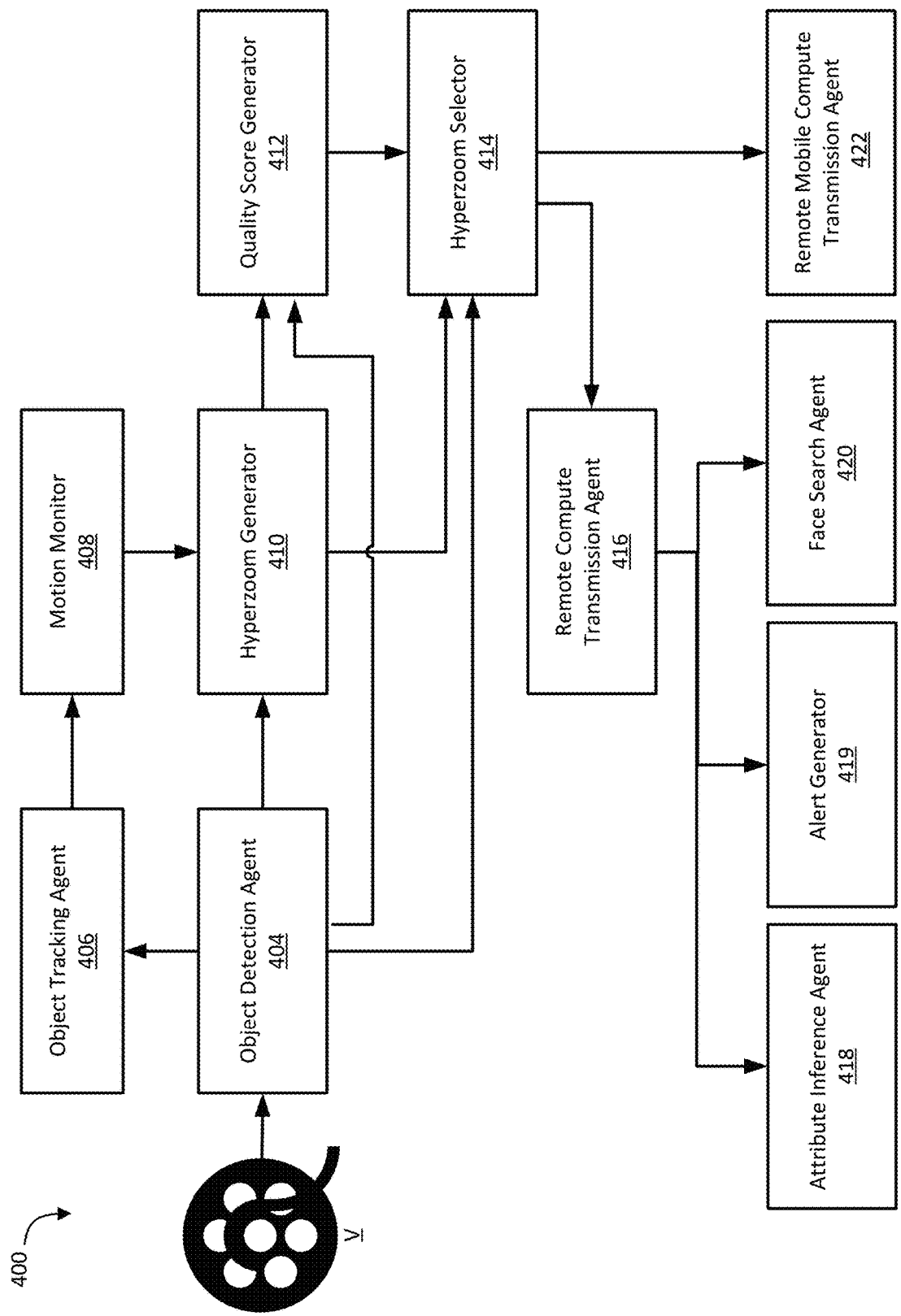
FIG. 4 is a system diagram showing a second example implementation of a system for generating and transmitting cropped images of objects based on video data, according to some embodiments.

FIG. 4 is a system diagram showing an example system 400 for generating and transmitting a cropped image(s) that depicts an object captured in a video stream, according to some embodiments. The system 400 can be included, for example, in the cropped image generation system 300 of FIG. 3. As shown in FIG. 4, the system 400 uses, as input, video imagery/data V collected via, by way of example, a video camera. Portions of the video imagery/data (e.g., portions that are pertinent to object and/or motion detection, such as date/time information, video frame numbers, short-duration video clips, etc.) can be streamed to the object detection agent 404. Although not shown in FIG. 4, the streamed video data portions can also be stored in a database (e.g., an Amazon™ Dynamo database), such that the streamed video data portion(s) can be later transmitted to and/or retrieved by a remote compute device. In response to the object detection agent 404 detecting and/or classifying an object depicted in the video imagery/data V and generating detection data (e.g., an object identification, a feature identification, a bounding box, a frame position, etc.), the detection data can be provided as input to the object tracking agent 406. The object tracking agent 406 can be configured to generate and/or update motion data (e.g., one or more motion tracks) using a motion model and based on the detection data, as described elsewhere herein.

The motion data can be provided as input to the motion monitor 408, which can be configured to confirm and/or delete a motion track based on the number of object detections associated with a motion track and/or an indication of an absence of detections associated with a motion track. The motion monitor 408 can provide confirmed motion data to the hyperzoom generator 410, configured to generate a cropped image(s) that depicts the object. In some implementations, as described elsewhere herein, the cropped image(s) can be generated from or based on a region of a video frame, and this video frame can be different (e.g., based on the number of pixels included in the video frame) from a video frame within the video imagery/data V provided as input to the object detection agent 404 and/or the object tracking agent 406.

The cropped image(s) can be provided as input to the quality score generator 412, which can be configured to assign an image quality score to each of the cropped image(s). An image quality score can be associated with, by way of example, a visibility of an object and/or a feature of the object, as described elsewhere herein. In some implementations, the quality score generator 412 can also receive object identification data generated by the object detection agent 404, such that the generated image quality score(s) are tailored for an object included in a specified class. The image quality score(s) can be provided to the hyperzoom selector 414, which is configured to determine a selection of cropped image(s) generated by the hyperzoom generator 410 to transmit to remote compute device(s). The hyperzoom selector 414 can also receive object identification data generated by the object detection agent 404 and use the object identification data to determine the selection of cropped image (s). For example, the hyperzoom selector 414 can determine a number of cropped image(s) to transmit to at least one remote compute device based on whether the object identification data indicates that the object is human and/or whether the object identification data includes data associated with a predefined object of interest (e.g., a car, a bicycle, a trashcan, and/or the like). In some implementations, the hyperzoom selector 414 can determine a number of cropped image(s) to transmit to at least one remote compute device based on whether the remote compute device is associated with a user (e.g., a remote mobile compute device) or a remote backend compute device. In some implementations, the hyperzoom selector 414 can determine a number of cropped image(s) and/or the selection of cropped image(s) to transmit to at least one remote compute device based on the image quality score(s). In some implementations, the hyperzoom selector 414 can be configured to generate two selections (e.g., sets) of cropped images. The first selection can be provided as input to the remote compute transmission agent 416 and the second selection can be provided as input to the remote mobile compute transmission agent 422.

The remote compute transmission agent 416 can be configured to, by way of example, provide the first selection of cropped image(s) to at least one of the attribute inference agent 418, the alert generator 419, or the face search agent 420, each of which can be included in a remote compute device. The attribute inference agent 418 can be configured to perform object feature identification (e.g., for an object that is a car, determining the color of the car), object identification confirmation, and/or object segmentation (e.g., for an object that is a car, determining which pixels of a cropped image depict the car). The alert generator 419 can be configured to generate a signal configured to cause an alert, alarm, notification, and/or the like, at a remote compute device associated with a user. The alert generator 419 can generate an alert, by way of example, in response to object identification confirmation performed by the attribute inference agent 418. The face search agent 420 can be configured to search a database of images that depict faces from a population of humans and compare these images to any cropped image(s) that depict a face. The face agent search agent 420 can be configured to, by way of example, generate a notification and/or alert if a face depicted in a cropped image is matched with a face depicted in an image from the database. The remote mobile compute transmission agent 422 can be configured to transmit the second selection of cropped image(s) to a compute device associated with a user and configured to display the cropped image(s).

Figure 5:
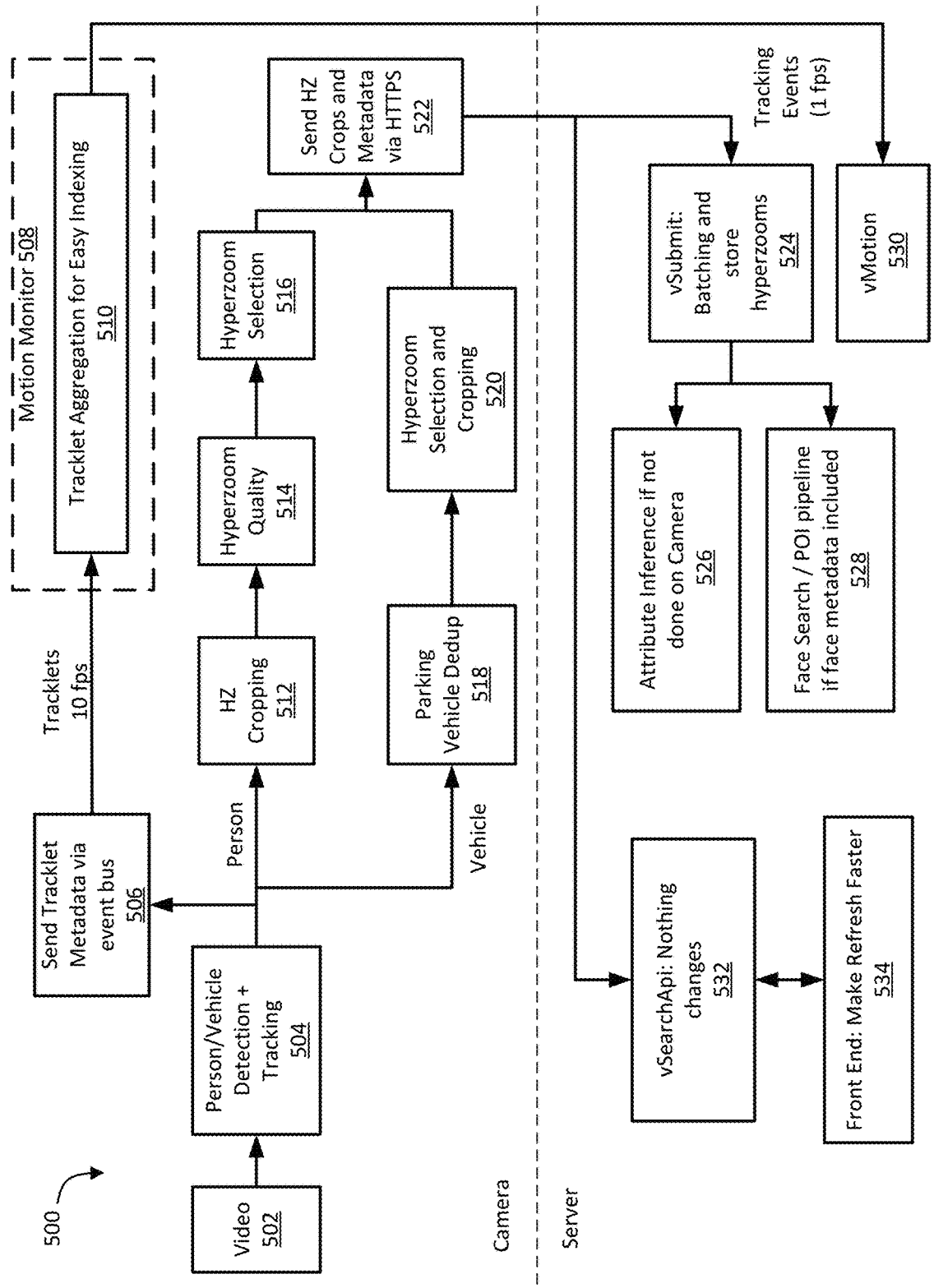
FIG. 5 is a system diagram showing a third example implementation of a system for generating and transmitting cropped images of objects based on video data, according to some embodiments.

FIG. 5 is a system diagram showing an example system 500 for generating and transmitting a cropped image(s) that depicts an object captured in a video stream, according to some embodiments. The system 500 can be included, for example, in the cropped image generation system 300 of FIG. 3 and/or the system 400 of FIG. 4. As shown in FIG. 5, the system 500 uses, as input, video imagery/data 502 collected via, by way of example, a video camera. A detection and tracking agent 504 can be configured to detect (e.g., classify) an object(s) depicted in the video data. In some instances, the detection and tracking agent 504 can be configured to classify a depicted object as a human or a vehicle. The tracking can include, for example, assigning an object detection to a motion track and/or confirming a motion track.

The system 500 can include a function 506 configured to send a tracklet(s) (e.g., a video clip(s), a collection of video frames, and/or the like) to the motion monitor 508, where the tracklet(s) include video data that depict object motion. In some instances, the system 500 can cause the tracklet(s) to be sent to the motion monitor 508 at 10 frames per second (fps). The motion monitor 508 can include a function 510 that is configured to aggregate tracklet(s) for improved indexing. The function 510 can associate similar tracklet(s) according to, for example, a key value and/or search word, such that the tracklet(s) can be retrieved from a database. For example, vMotion 530 can be configured to retrieve video clips (i.e., tracklet(s)) to display to a user based on the indexing scheme. The tracklet(s) received by vMotion 530 can have a reduced frame rate (e.g., 1 frame per second).

The system 500 can be configured to generate cropped images (e.g., hyperzoom images) using a method from a plurality (e.g., two) methods, where the method is selected based on the object classification (e.g., based on whether the depicted object is classified as a human or a vehicle). For example, if the depicted object is classified as a human, and the human is associated with motion, a function 512 performed by, for example, a first machine learning model can crop the video data 502 that depicts the human to generate cropped images of the human. For each copped image, a function 514 performed by, for example, a second machine learning model can generate a quality score. Based on these quality scores, a function 516 can select the cropped image(s) that, for example, best depict the face of the depicted human. In some instances, the selection of the cropped image(s) can be based on a preference of a customer that is to receive the selection of the cropped image(s). For example, a customer that is generating a face image pipeline can prefer to receive a plurality of cropped image(s) for a single motion track (e.g., cropped images can be transmitted at a higher send interval).

If the object depicted in the video data 502 is classified as a vehicle, the system 500 can use the function 518 to determine whether the depicted vehicle is in the process of parking and/or slowing down, or if it is driving through the area monitored by the video camera. If, for example, the vehicle is parking within the area monitored by the video camera, a function 520 performed by, for example, a third machine learning model can generate a cropped image(s) of the vehicle. The function 520 can further select a subset of the cropped image(s) based on, for example, the visibility of the vehicle's license plate.

The function 522 can be configured to send the selected cropped image(s) (e.g., an image(s) that depicts a vehicle and/or human) to one or more remote compute devices (e.g., a server and/or a mobile compute device) via, for example, hypertext transfer protocol secure (HTTPS). A remote compute device can be configured to use function 524 to batch and/or store cropped images, such that the cropped images can be retrieved by a service(s). For example, a service can include service 526 configured to infer an attribute(s) of an object depicted in a cropped image(s). A service can also include service 528 configured to perform a face search against a face database to identify a human depicted in a cropped image(s). The service 528 can be further configured to generate and/or add to a face pipeline based on a face(s) depicted in the cropped image(s).

The system 500 can further include a function 532 configured to indicate to the front end 534 whether a new cropped image(s) has been received (e.g. via function 522) by a remote compute device (e.g., a server) calling the function 532. The front end 534 can be configured to adjust the frequency at which the function 532 is called to check whether a new cropped image has been received from function 522, such that the remote compute device can detect a received cropped image(s) more often or less often.

Figure 6:
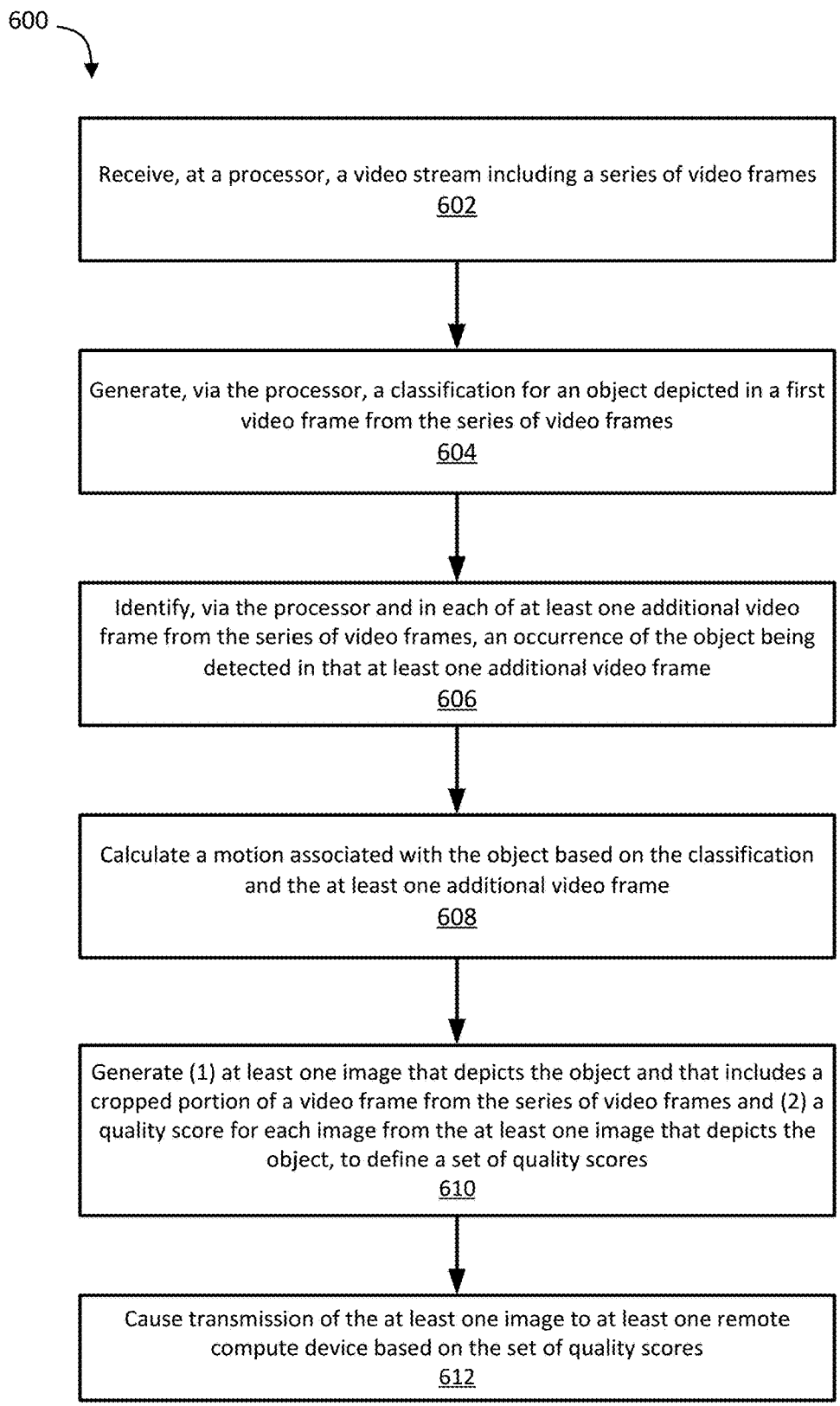
FIG. 6 is a flow diagram showing a method for generating and transmitting cropped images of objects based on video data, according to some embodiments.

FIG. 6 is a flow diagram showing a method 600 for generating and transmitting a cropped image(s) that depicts an object captured in a video stream, according to some embodiments. The method 600 can be implemented, for example, using the cropped image generation system 300 of FIG. 3. As shown in FIG. 6, the method 600 includes receiving, at 602, at a processor of a video camera system, a video stream including a series of video frames depicting at least one object. The series of video frames can include consecutive video frames and/or non-consecutive video frames. At 604, a classification for the object is generated, via the processor of the video camera system. The method 600 also includes, at 606, identifying an occurrence of the object being detected in an additional video frame(s) from the series of video frames. At 608, a motion associated with the object is calculated based on the classification and the at least one additional video frame. At 610, and in response to calculating the motion, at least one image that depicts the object and that includes a cropped portion of a video frame from the series of video frames is generated, via the processor of the video camera system. Also at 610, a quality score is generated for each image from the at least one image that depicts the object, to define a set of quality scores, via the processor of the video camera system. At 612, the method 600 includes causing transmission of the at least one image to at least one remote compute device based on the set of quality scores.

Figure 7:
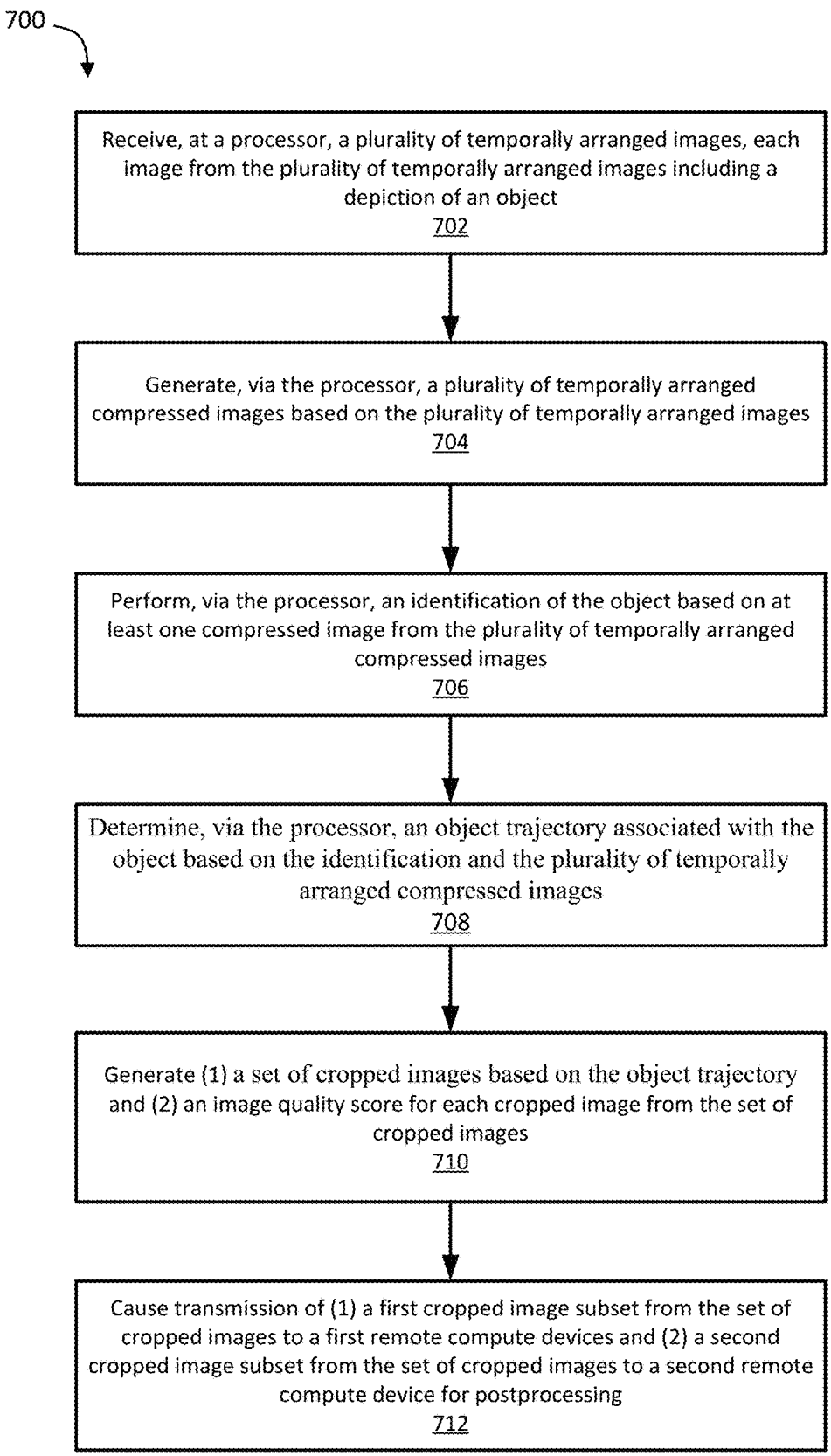
FIG. 7 is a flow diagram showing a method for generating and transmitting cropped images of objects based on video data, according to some embodiments.

FIG. 7 is a flow diagram showing a method 700 for generating and transmitting a cropped image(s) that depicts an object captured in a video stream, according to some embodiments. The method 700 can be implemented, for example, using the cropped image generation system 300 of FIG. 3. As shown in FIG. 7, the method 700, at 702, includes receiving, at a processor, a plurality of temporally arranged images, each image from the plurality of temporally arranged images including a depiction of an object. At 704, a plurality of temporally arranged compressed images are generated based on the plurality of temporally arranged images. At 706, the processor performs an identification of the object based on at least one compressed image from the plurality of temporally arranged compressed images. At 708, the processor determines an object trajectory associated with the object based on the identification and the plurality of temporally arranged compressed images. At 710, a set of cropped images are generated based on the object trajectory, and an image quality score is generated for each image from the set of cropped images. At 712, the processor causes transmission of (1) a first cropped image subset from the set of cropped images to a first remote compute devices and (2) a second cropped image subset from the set of cropped images to a second remote compute device for postprocessing. The first cropped image subset and the second copped image subset are each selected from the set of cropped images based on the respective image quality score for each cropped image.

Figure 8:
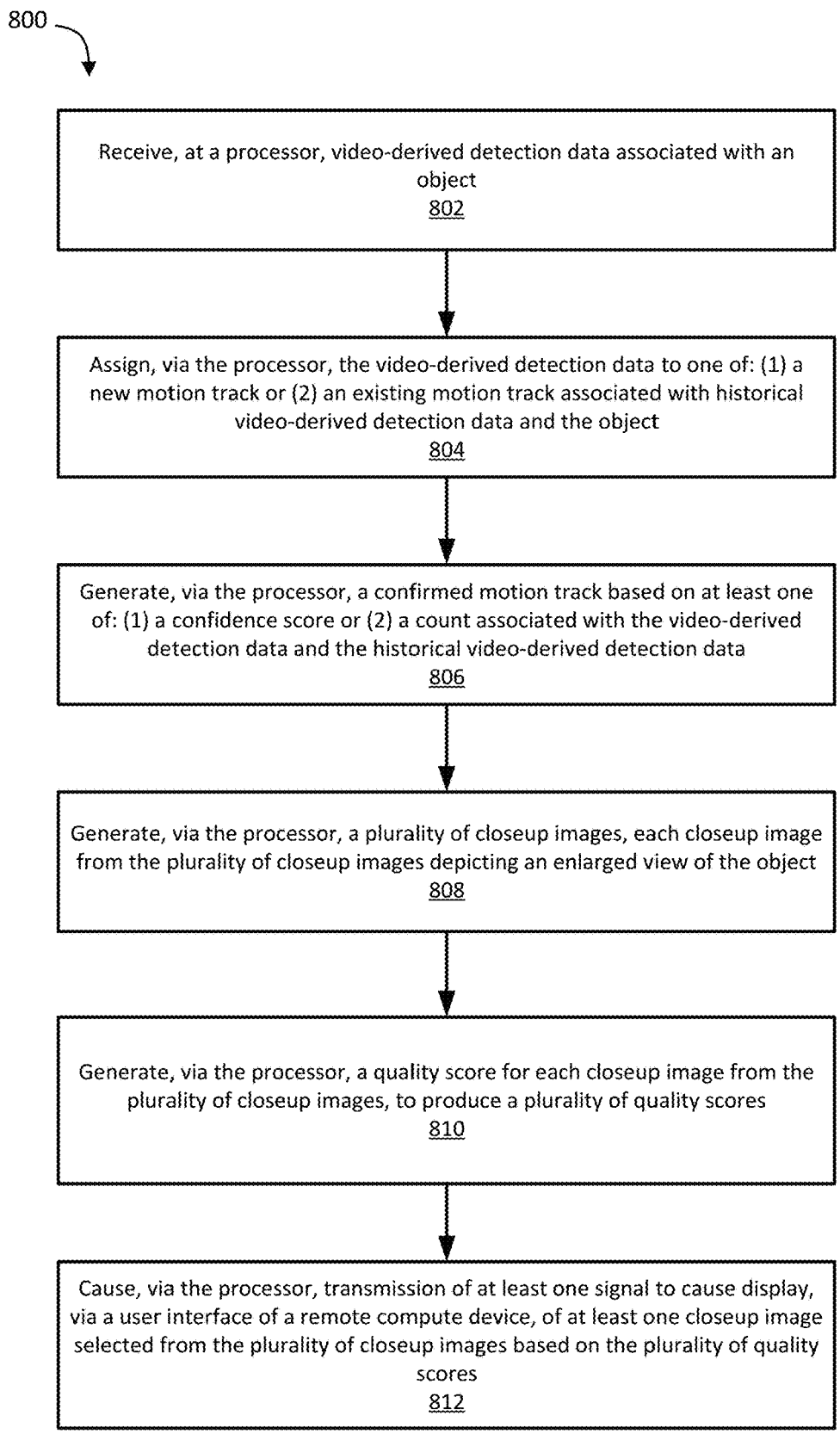
FIG. 8 is a flow diagram showing a method for generating and transmitting cropped images of objects based on video data, according to some embodiments.

FIG. 8 is a flow diagram showing a method 800 for generating and transmitting a cropped image(s) that depicts an object captured in a video stream, according to some embodiments. The method 800 can be implemented, for example, using the cropped image generation system 300 of FIG. 3. As shown in FIG. 8, the method 800, at 802, includes receiving, at a processor, video-derived detection data associated with an object. At 804, the processor assigns the video-derived detection data to one of: (1) a new motion track or (2) an existing motion track associated with historical video-derived detection data and the object. At 806, the method 800 includes generating, via the processor, a confirmed motion track based on at least one of: (1) a confidence score or (2) a count associated with the video-derived detection data and the historical video-derived detection data. At 808, the processor generates a plurality of closeup images, each closeup image from the plurality of closeup images depicting an enlarged view of the object. At 810, the method 800 includes generating, via the processor, a quality score for each closeup image from the plurality of closeup images, to produce a plurality of quality scores. At 812, the processor causes transmission of at least one signal to cause display, via a user interface of a remote compute device, of at least one closeup image selected from the plurality of closeup images based on the plurality of quality scores.

Figure 9:
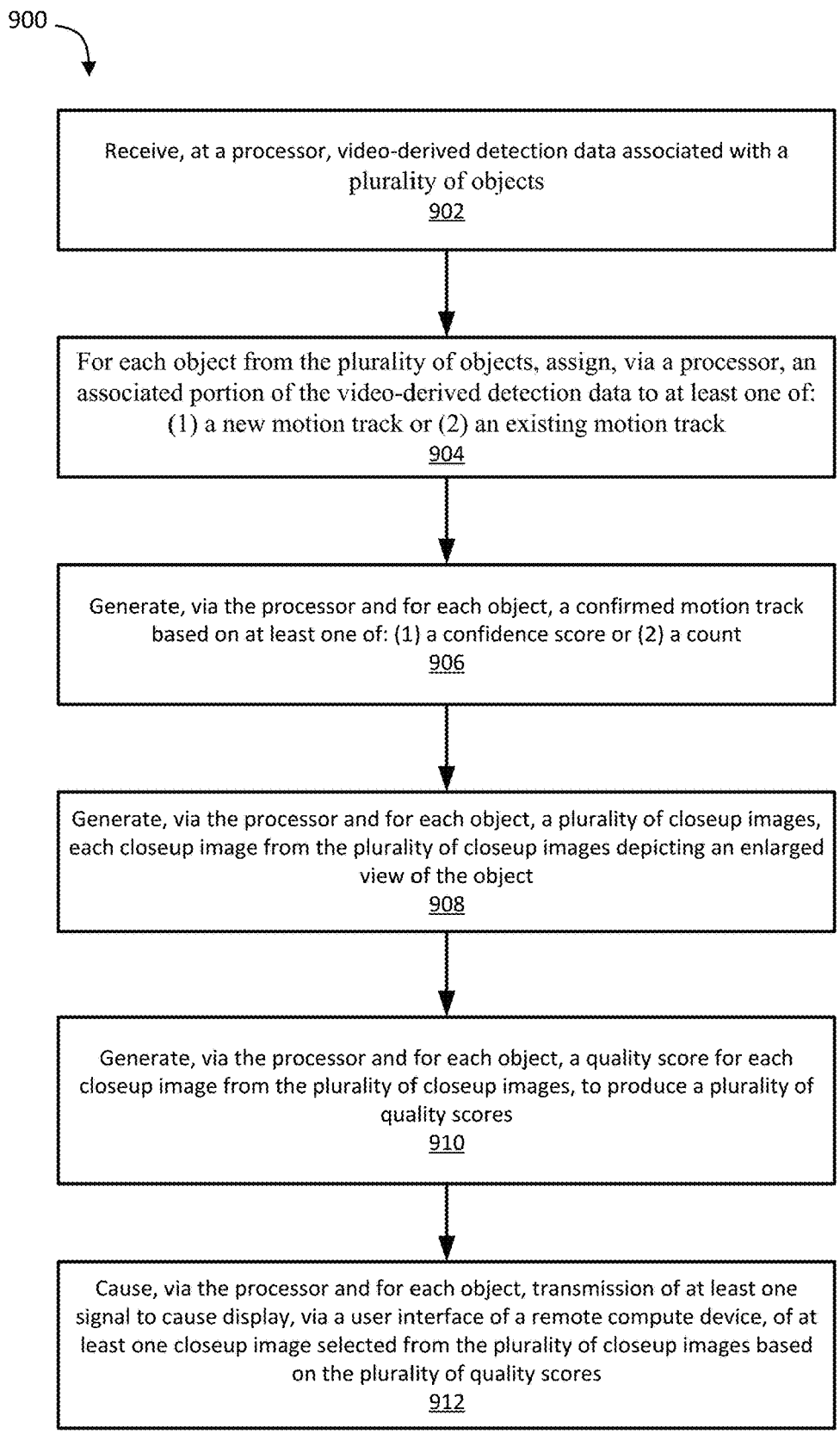
FIG. 9 is a flow diagram showing a method for generating and transmitting cropped images of objects based on video data, according to some embodiments.

FIG. 9 is a flow diagram showing a method 900 for generating and transmitting a cropped image(s) that depicts an object captured in a video stream, according to some embodiments. The method 900 can be implemented, for example, using the cropped image generation system 300 of FIG. 3. As shown in FIG. 8, the method 900, at 902, includes receiving, at a processor, video-derived detection data associated with a plurality of objects. At 904, for each object from the plurality of objects, the processor assigns the video-derived detection data to one of: (1) a new motion track or (2) an existing motion track associated with historical video-derived detection data and the object. At 906, the method 900 includes generating, via the processor and for each object from the plurality of objects, a confirmed motion track based on at least one of: (1) a confidence score or (2) a count associated with the video-derived detection data and the historical video-derived detection data. At 908, for each object from the plurality of objects, the processor generates a plurality of closeup images, each closeup image from the plurality of closeup images depicting an enlarged view of the object. At 910, the method 900 includes generating, via the processor and for each object from the plurality of objects, a quality score for each closeup image from the plurality of closeup images, to produce a plurality of quality scores. At 912, for each object from the plurality of objects, the processor causes transmission of at least one signal to cause display, via a user interface of a remote compute device, of at least one closeup image selected from the plurality of closeup images based on the plurality of quality scores.

In some embodiments, an apparatus includes a processor and a memory operably coupled to the processor. The memory stores instructions to cause the processor to receive a video stream including a series of video frames and to generate a classification for an object depicted in a first video frame from the series of video frames. The memory also stores instructions to cause the processor to identify, in each of at least one additional video frame from the series of video frames, an occurrence of the object being detected in that at least one additional video frame. The memory also stores instructions to cause the processor to calculate a motion associated with the object based on the classification and the at least one additional video frame. The memory also stores instructions to cause the processor to generate at least one image that depicts the object and that includes a cropped portion of a video frame from the series of video frames. The memory also stores instructions to cause the processor to generate a quality score for each image from the at least one image that depicts the object, to define a set of quality scores. The memory also stores instructions to cause the processor to cause transmission of the at least one image to at least one remote compute device based on the set of quality scores.

In some implementations, the apparatus can include a video camera operably coupled to the processor and configured to generate the video stream. Alternatively or in addition, in some implementations, the instructions to cause the processor to generate the at least one image can include instructions to generate the at least one image based on whether the classification indicates that the object includes a human. Alternatively or in addition, in some implementations, the instructions to cause the processor to generate the at least one image can include instructions to generate the at least one image based on the classification. Alternatively or in addition, in some implementations, the instructions to generate the quality score for each image from the at least one image can include instructions to generate the quality score based on at least one of: (1) an orientation of the object as depicted in that image, (2) a position of at least one pixel within a video frame, from the at least one additional video frame, that is associated with that image, the at least one pixel representing at least a portion of the object, or (3) a visibility of at least one feature of the object depicted in that image. In some implementations, the visibility can be associated with at least one of a resolution metric, a size metric, or a clarity metric associated with the object as depicted in that image. Alternatively or in addition, in some implementations, the instructions to generate the at least one image can include instructions to generate the at least one image based on whether the motion associated with the object indicates that the object is nonstationary across the series of video frames. Alternatively or in addition, in some implementations, each of the at least one image can have a first image resolution, and each video frame from the series of video frames can have a second image resolution that is less than the first image resolution. Alternatively or in addition, in some implementations, the instructions to cause the transmission of the at least one image to the at least one remote compute device can include instructions to cause transmission of a signal that causes the at least one remote compute device to at least one of: (1) display an image from the at least one image, (2) perform additional object identification based on the at least one image, (3) identify a feature associated with the object based on the at least one image, (4) perform object segmentation based on the at least one image, or (5) generate an alert based on the at least one image.

Alternatively or in addition, in some implementations, the object can be a first object, the quality score can be a first quality score, the set of quality scores can be a first set of quality scores, and the memory can further store instructions to cause the processor to classify at least one second object depicted in the first video frame from the series of video frames, to define a set of at least one classification. The memory can further store instructions to cause the processor to identify, in each of the at least one additional video frame from the series of video frames, an occurrence of each second object from the at least one second object being detected in that at least one additional video frame. The memory can further store instructions to cause the processor to calculate respective motion associated with the at least one second object based on the set of at least one classification and the at least one additional video frame. The memory can further store instructions to cause the processor to generate at least one image that depicts the at least one second object and that includes a cropped portion of a video frame from the series of video frames. The memory can further store instructions to cause the processor to generate a second quality score for each image from the at least one image that depicts the at least one second object, to define a second set of quality scores. The memory can further store instructions to cause the processor to cause transmission of the at least one image that depicts the at least one second object to the at least one remote compute device, based on the second set of quality scores.

In some embodiments, a non-transitory, processor-readable medium stores instructions that, when executed by a processor, cause the processor to receive a plurality of temporally arranged images, each image from the plurality of temporally arranged images including a depiction of an object. The non-transitory, processor-readable medium also stores instructions to generate a plurality of temporally arranged compressed images based on the plurality of temporally arranged images. The non-transitory, processor-readable medium also stores instructions to perform an identification of the object based on at least one compressed image from the plurality of temporally arranged compressed images. The non-transitory, processor-readable medium also stores instructions to determine an object trajectory associated with the object based on the identification and the plurality of temporally arranged compressed images. The non-transitory, processor-readable medium also stores instructions to generate a set of cropped images based on the object trajectory, each cropped image from the set of cropped images including a region of an image from the plurality of temporally arranged images, the image being different from each remaining image from the plurality of temporally arranged images, the region being smaller than an entirety of the image and depicting the object. For each cropped image from the set of cropped images, an image quality score is based on the associated region depicting the object, and that cropped image is included in at least one of a first cropped image subset or a second cropped image subset based on the image quality score and the identification. Additionally, for each cropped image from the set of cropped images, the first cropped image subset is transmitted to a first remote compute device for display, and the second cropped image subset is transmitted to a second remote compute device different from the first remote compute device, for postprocessing.

In some implementations, the plurality of temporally arranged images can include images generated by at least one sensor of a video camera. Alternatively or in addition, in some implementations, the first cropped image subset can include a first number of cropped images and the second cropped image subset includes a second number of cropped images that is greater than the first number of cropped images. Alternatively or in addition, in some implementations, the postprocessing can include at least one of object feature classification, object identification confirmation, or facial recognition. Alternatively or in addition, in some implementations, the instructions to generate the image quality score for each cropped image from the set of cropped images can include instructions to generate each image quality score based on a distance between a first pixel disposed in the associated region and a second pixel disposed substantially centrally in the respective image from the plurality of temporally arranged images. Alternatively or in addition, in some implementations, the identification can include an indication that the object has a human face, and the instructions to generate the image quality score for each cropped image from the set of cropped images can include instructions to generate each image quality score based on a confidence value associated with the indication and an obfuscation value associated with the human face. Alternatively or in addition, in some implementations, each cropped image from the first cropped image subset can have an associated image quality score that is above a predefined threshold.

In some embodiments, a non-transitory, processor-readable medium storing instructions that, when executed by a processor, cause the processor to receive video-derived detection data associated with an object and assign the video-derived detection data to one of: (1) a new motion track, or (2) an existing motion track associated with historical video-derived detection data associated with the object. The processor-readable medium also stores instructions to cause the processor to generate a confirmed motion track based on at least one of: (1) a confidence score associated with at least one of the video-derived detection data or the historical video-derived detection data, or (2) a count associated with the video-derived detection data and the historical video-derived detection data. The processor-readable medium also stores instructions to cause the processor to generate a plurality of closeup images, each closeup image from the plurality of closeup images depicting an enlarged view of the object based on the confirmed motion track and at least one of the video-derived detection data or the historical video-derived detection data. The processor-readable medium also stores instructions to cause the processor to generate a quality score for each closeup image from the plurality of closeup images, to produce a plurality of quality scores. The processor-readable medium also stores instructions to cause the processor to select at least one closeup image from the plurality of closeup images based on the plurality of quality scores, and transmit at least one signal to cause display of the at least one closeup image via a user interface of a remote compute device.

In some implementations, at least one quality score from the plurality of quality scores associated with the selected at least one closeup image can be higher than at least one quality score from the plurality of quality scores associated with remaining closeup images from the plurality of closeup images. Alternatively or in addition, in some implementations, the processor-readable medium can further store instructions to cause the processor to delete the confirmed motion track based on a lack of video-derived detection data associated with the object being generated during a predefined time period. Alternatively or in addition, in some implementations, wherein the instructions to select the at least one closeup image can include instructions to: (1) receive a user input including an indication of a closeup image transmission frequency, and (2) select at least one closeup image from the plurality of closeup images based on (a) the respective quality scores for the plurality of closeup images, and (b) the user input. Alternatively or in addition, in some implementations, the instructions to select the at least one closeup image can include instructions to: (1) detect that the object is human, and (2) select at least one closeup image from the plurality of closeup images based on the respective quality scores for the plurality of closeup images. Alternatively or in addition, in some implementations, the instructions to select the at least one closeup image include instructions to: (1) detect that the object is an object of interest, and (2) select at least one closeup image from the plurality of closeup images based on (a) the respective quality scores for the plurality of closeup images, and (b) the determination. Alternatively or in addition, in some implementations, the object of interest is a vehicle.

In some embodiments, a non-transitory, processor-readable medium stores instructions that, when executed by a processor, cause the processor to receive video-derived detection data associated with a plurality of objects. For each object from the plurality of objects, and based on a plurality of motion models, processor-readable medium stores instructions that cause the processor to assign an associated portion of the video-derived detection data to at least one of: (1) a new motion track, or (2) an existing motion track associated with historical video-derived detection data associated with the plurality of objects. For each of at least one object from the plurality of objects a confirmed motion track is generated based on at least one of: (1) a confidence score associated with at least one of the video-derived detection data or the historical video-derived detection data, or (2) a count associated with the video-derived detection data and the historical video-derived detection data. A plurality of closeup images are also generated, each closeup image from the plurality of closeup images depicting an enlarged view of that object from the at least one object based on the confirmed motion track for that object and at least one of the video-derived detection data or the historical video-derived detection data. A quality score for each closeup image is also generated from the plurality of closeup images, to produce a plurality of quality scores, and at least one closeup image is selected from the plurality of closeup images based on the plurality of quality scores. At least one signal is transmitted to cause display of the at least one closeup image via a user interface of a remote compute device.

In some implementations, the plurality of motion models can include a plurality of Kalman filters each configured based on a respective object type associated with the plurality of objects. Alternatively or in addition to, in some implementations, the non-transitory processor can further store instructions to cause the processor to delete the confirmed motion track based on an absence, during a time period, of a detection associated with that object from the at least one object. Alternatively or in addition to, in some implementations, the non-transitory processor can further store instructions to cause the processor to send the plurality of closeup images to at least one second processor configured to perform feature detection based on the plurality of closeup images. Alternatively or in addition to, in some implementations, the confidence score can be based on a probability that the video-derived detection data correctly classifies that object from the at least one object. Alternatively or in addition to, in some implementations, the instructions to select the at least one closeup image can include instructions to select the at least one closeup image from the plurality of closeup images based on a classification associated with that object from the at least one object.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
    a processor; and
    a memory operably coupled to the processor, the memory storing instructions to cause the processor to:
        receive a video stream including a first series of video frames, each frame from the first series of video frames having a first image resolution;
        generate a classification for an object depicted in a first video frame from the first series of video frames;
        identify, in each of at least one additional video frame from the first series of video frames, an occurrence of the object being detected in that at least one additional video frame;
        calculate a motion associated with the object based on the classification and the at least one additional video frame;
        generate, based on the motion, at least one image that depicts the object and that includes a cropped portion of a video frame from a second series of video frames different from the first series of video frames, each frame from the second series of video frames having a second image resolution that is greater than the first image resolution;
        generate a quality score for each image from the at least one image that depicts the object, to define a set of quality scores; and
        cause transmission of the at least one image to at least one remote compute device based on the set of quality scores.

2. The apparatus of claim 1, further comprising a video camera operably coupled to the processor, the video stream being generated by the video camera.

3. The apparatus of claim 1, wherein the instructions to cause the processor to generate the at least one image include instructions to generate the at least one image based on whether the classification indicates that the object includes a human.

4. The apparatus of claim 1, wherein the instructions to cause the processor to generate the at least one image include instructions to generate the at least one image based on the classification.

5. The apparatus of claim 1, wherein:
    the instructions to generate the quality score for each image from the at least one image include instructions to generate the quality score based on at least one of: (1) an orientation of the object as depicted in that image, (2) a position of at least one pixel within a video frame, from the at least one additional video frame, that is associated with that image, the at least one pixel representing at least a portion of the object, or (3) a visibility of at least one feature of the object depicted in that image.

6. The apparatus of claim 5, wherein the visibility is associated with at least one of a resolution metric, a size metric, or a clarity metric associated with the object as depicted in that image.

7. The apparatus of claim 1, wherein the instructions to generate the at least one image include instructions to generate the at least one image based on whether the motion associated with the object indicates that the object is non-stationary across the first series of video frames.

8. The apparatus of claim 1, wherein the instructions to cause the transmission of the at least one image to the at least one remote compute device include instructions to cause transmission of a signal that causes the at least one remote compute device to at least one of: (1) display an image from the at least one image, (2) perform additional object identification based on the at least one image, (3) identify a feature associated with the object based on the at least one image, (4) perform object segmentation based on the at least one image, or (5) generate an alert based on the at least one image.

9. The apparatus of claim 1, wherein the object is a first object, the at least one image is at least one first image, the quality score is a first quality score, the set of quality scores is a first set of quality scores, and the memory further stores instructions to cause the processor to:
    classify at least one second object depicted in the first video frame from the first series of video frames, to define a set of at least one classification;
    identify, in each of the at least one additional video frame from the first series of video frames, an occurrence of each second object from the at least one second object being detected in that at least one additional video frame;
    calculate respective motion associated with the at least one second object based on the set of at least one classification and the at least one additional video frame;
    generate at least one second image that depicts the at least one second object and that includes a cropped portion of the video frame from the second series of video frames;
    generate a second quality score for each image from the at least one image that depicts the at least one second object, to define a second set of quality scores; and
    cause transmission of the at least one image that depicts the at least one second object to the at least one remote compute device, based on the second set of quality scores.

10. A non-transitory, processor-readable medium storing instructions that, when executed by a processor, cause the processor to:

receive a plurality of temporally arranged images, each image from the plurality of temporally arranged images including a depiction of an object;
generate a plurality of temporally arranged compressed images based on the plurality of temporally arranged images;
perform an identification of the object based on at least one compressed image from the plurality of temporally arranged compressed images;
determine an object trajectory associated with the object based on the identification and the plurality of temporally arranged compressed images;
generate a set of cropped images based on the object trajectory, each cropped image from the set of cropped images including a region of an image from the plurality of temporally arranged images, the image being different from each remaining image from the plurality of temporally arranged images, the region being smaller than an entirety of the image and depicting the object;
for each cropped image from the set of cropped images:
  generate an image quality score based on the associated region depicting the object; and
  include that cropped image in at least one of a first cropped image subset or a second cropped image subset based on the image quality score and the identification;
cause transmission of the first cropped image subset to a first remote compute device for display; and
cause transmission of the second cropped image subset to a second remote compute device different from the first remote compute device, for postprocessing.

11. The non-transitory, processor-readable medium of claim 10, wherein the plurality of temporally arranged images include images generated by at least one sensor of a video camera.

12. The non-transitory, processor-readable medium of claim 10, wherein the first cropped image subset includes a first number of cropped images and the second cropped image subset includes a second number of cropped images that is greater than the first number of cropped images.

13. The non-transitory, processor-readable medium of claim 10, wherein the postprocessing includes at least one of object feature classification, object identification confirmation, or facial recognition.

14. The non-transitory, processor-readable medium of claim 10, wherein the instructions to generate the image quality score for each cropped image from the set of cropped images include instructions to generate each image quality score based on a distance between a first pixel disposed in the associated region and a second pixel disposed substantially centrally in the respective image from the plurality of temporally arranged images.

15. The non-transitory, processor-readable medium of claim 10, wherein:
the identification includes an indication that the object has a human face; and
the instructions to generate the image quality score for each cropped image from the set of cropped images include instructions to generate each image quality score based on a confidence score associated with the indication and an obfuscation value associated with the human face.

16. The non-transitory, processor-readable medium of claim 10, wherein each cropped image from the first cropped image subset has an associated image quality score that is above a predefined threshold.

17. The non-transitory, processor-readable medium of claim 10, wherein the at least one of the first cropped image subset or the second cropped image subset includes (1) a first number of cropped images based on the identification indicating that the object is a human or (2) a second number of cropped images based on the identification indicating that the object is a vehicle, the first number of cropped images being greater than the second number of cropped images.

18. A non-transitory, processor-readable medium storing instructions that, when executed by a processor, cause the processor to:
receive detection data derived from first video data and associated with an object;
assign the detection data to one of: (1) a new motion track, or (2) an existing motion track associated with historical video-derived detection data associated with the object;
generate a confirmed motion track based on at least one of: (1) a confidence score associated with at least one of the detection data or the historical video-derived detection data, or (2) a count associated with the detection data and the historical video-derived detection data;
generate a plurality of closeup images, each closeup image from the plurality of closeup images depicting an enlarged view of the object based on the confirmed motion track and second video data, a resolution of the first video data being lower than a resolution of the second video data;
generate a quality score for each closeup image from the plurality of closeup images, to produce a plurality of quality scores;
select at least one closeup image from the plurality of closeup images based on the plurality of quality scores; and
cause transmission of at least one signal to cause display of the at least one closeup image via a user interface of a remote compute device.

19. The non-transitory, processor-readable medium of claim 18, wherein at least one quality score from the plurality of quality scores associated with the selected at least one closeup image is higher than at least one quality score from the plurality of quality scores associated with remaining closeup images from the plurality of closeup images.

20. The non-transitory, processor-readable medium of claim 18, further storing instructions to cause the processor to delete the confirmed motion track based on a lack of video-derived detection data associated with the object being generated during a predefined time period.

21. The non-transitory, processor-readable medium of claim 18, wherein the instructions to select the at least one closeup image includes instructions to: (1) receive a user input including an indication of a closeup image transmission frequency, and (2) select at least one closeup image from the plurality of closeup images based on (a) the respective quality scores for the plurality of closeup images, and (b) the user input.

22. The non-transitory, processor-readable medium of claim 18, wherein the instructions to select the at least one closeup image include instructions to: (1) detect that the object is human, and (2) select at least one closeup image from the plurality of closeup images based on the respective quality scores for the plurality of closeup images.

23. The non-transitory, processor-readable medium of claim 18, wherein the instructions to select the at least one closeup image include instructions to: (1) detect that the object is an object of interest, and (2) select at least one closeup image from the plurality of closeup images based on (a) the respective quality scores for the plurality of closeup images, and (b) the detection data indicating an object type for the object.

24. The non-transitory, processor-readable medium of claim 23, wherein the object of interest is a vehicle.

25. A non-transitory, processor-readable medium storing instructions that, when executed by a processor, cause the processor to:
receive detection data derived from first video data and associated with a plurality of objects;
for each object from the plurality of objects, and based on a plurality of motion models, assign an associated portion of the detection data to at least one of: (1) a new motion track, or (2) an existing motion track associated with historical video-derived detection data associated with the plurality of objects; and
for each of at least one object from the plurality of objects:
generate a confirmed motion track based on at least one of: (1) a confidence score associated with at least one of the detection data or the historical video-derived detection data, or (2) a count associated with the detection data and the historical video-derived detection data;
generate a plurality of closeup images, each closeup image from the plurality of closeup images depicting an enlarged view of that object from the at least one object based on the confirmed motion track for that object and second video data, a resolution of the first video data being lower than a resolution of the second video data;
generate a quality score for each closeup image from the plurality of closeup images, to produce a plurality of quality scores;
select at least one closeup image from the plurality of closeup images based on the plurality of quality scores; and
cause transmission of at least one signal to cause display of the at least one closeup image via a user interface of a remote compute device.

26. The non-transitory, processor-readable medium of claim 25, wherein the plurality of motion models includes a plurality of Kalman filters each configured based on a respective object type associated with the plurality of objects.

27. The non-transitory, processor-readable medium of claim 25, further storing instructions to cause the processor to delete the confirmed motion track based on an absence, during a time period, of a detection associated with that object from the at least one object.

28. The non-transitory, processor-readable medium of claim 25, further storing instructions to cause the processor to send the plurality of closeup images to at least one second processor configured to perform feature detection based on the plurality of closeup images.

29. The non-transitory, processor-readable medium of claim 25, wherein the confidence score is based on a probability that the detection data correctly classifies that object from the at least one object.

30. The non-transitory, processor-readable medium of claim 25, wherein the instructions to select the at least one closeup image include instructions to select the at least one closeup image from the plurality of closeup images based on a classification associated with that object from the at least one object.

* * * * *